(12) United States Patent
Halley et al.

(10) Patent No.: US 6,379,090 B1
(45) Date of Patent: Apr. 30, 2002

(54) FORCE BALANCED IRREGULAR PITCH REAMER AND ASSOCIATED REAMING METHOD

(75) Inventors: Jeremiah E. Halley, St. Louis, MO (US); Jeffery J. Luner, Collinsville, (US); Keith Young, Edwardsville, both of IL (US); Philip V. Bayly, St. Louis, MO (US)

(73) Assignees: The Boeing Company, Seattle, WA (US); Washington University, St. Louis, MO (US)

( * ) Notice: Subject to any disclaimer, the term of this patent is extended or adjusted under 35 U.S.C. 154(b) by 17 days.

(21) Appl. No.: 09/608,070

(22) Filed: Jun. 30, 2000

(51) Int. Cl.[7] ............................................. B23B 51/00
(52) U.S. Cl. ..................................... 408/227; 408/229
(58) Field of Search .......................... 408/1 R, 57, 59, 408/227, 229, 199

(56) References Cited

U.S. PATENT DOCUMENTS

| | | | | |
|---|---|---|---|---|
| 1,514,704 A | * | 11/1924 | Jack | 408/229 |
| 4,149,821 A | * | 4/1979 | Faber | 408/199 |
| 4,659,264 A | | 4/1987 | Friedline | |
| 4,740,121 A | | 4/1988 | Arnold | |
| 4,889,456 A | * | 12/1989 | Killinger | 408/224 |
| 5,049,011 A | * | 9/1991 | Bohnet et al. | 408/223 |
| 5,312,208 A | | 5/1994 | Shiga et al. | |
| 5,758,997 A | * | 6/1998 | Mealey et al. | 408/224 |

FOREIGN PATENT DOCUMENTS

| | | | | |
|---|---|---|---|---|
| AT | 141103 A | * | 3/1935 | 408/227 |
| DE | 1627238 A | * | 12/1970 | 408/227 |
| DE | 2910828 A | * | 9/1980 | 408/227 |
| DE | 239965 A1 | * | 10/1986 | 408/227 |

* cited by examiner

*Primary Examiner*—Daniel W. Howell
(74) *Attorney, Agent, or Firm*—Alston & Bird LLP

(57) ABSTRACT

A force balanced irregular pitch reamer is provided that is particularly well suited for precision operations requiring small tolerances. More specifically, a reamer is provided having a shank, a body portion, and a plurality of cutting teeth extending outwardly therefrom. The teeth are spaced at non-uniform intervals around the body portion, wherein each tooth includes a cutting surface and rake face, and defines a rake angle between the rake face and an imaginary line extending from the central or longitudinal axis of the reamer to the cutting surface. In operation, the reamer is rotated about its central axis and is plunged into a formed hole sized slightly smaller than the reamer such that the reamer engages the workpiece and produces a smooth finished hole. Each tooth generates a cutting force with determinable magnitude and direction to define cutting force vectors. Advantageously, the reamer of the present invention includes teeth having rake angles cooperatively formed such that the cutting force vectors are substantially offset by one another, thus balancing the reamer and providing a finished hole that is substantially free from any lobes and is properly sized.

8 Claims, 4 Drawing Sheets

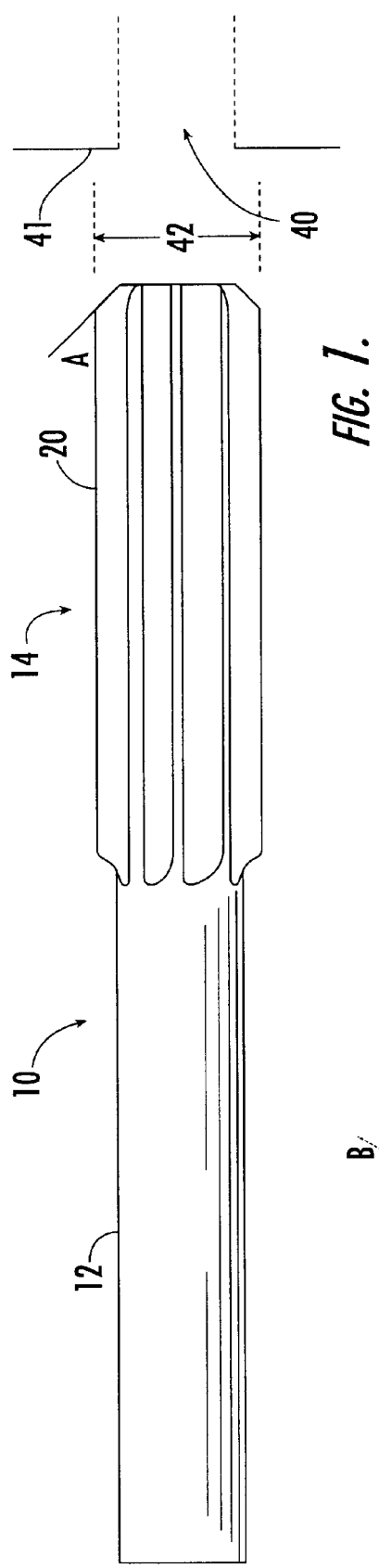
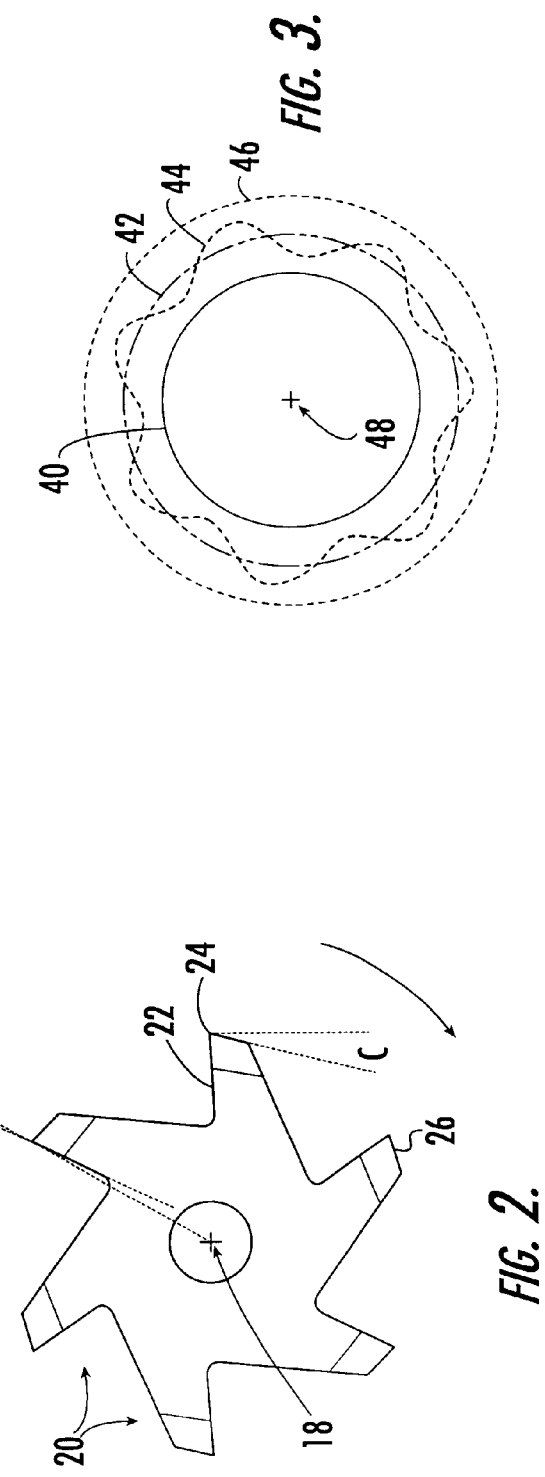

FORCE BALANCED IRREGULAR PITCH REAMER AND ASSOCIATED REAMING METHOD

FIELD OF THE INVENTION

This invention pertains generally to the field of cutting tools and, more specifically, it pertains to cutting tools known as reamers and associated reaming methods.

BACKGROUND OF THE INVENTION

Reamers are cutting tools that are typically used to perform the final cutting operation on holes, particularly holes with small tolerances. Specifically, reamers perform secondary cutting operations after a hole has been drilled close to a desired final size. Reamers therefore typically have an external diameter that is slightly larger than that of the drilled hole, and are designed to finish the hole to within a small tolerance of the desired size and to provide a relatively smooth inner wall.

Standard reamers typically include a shank, a body portion at one end of the shank, and a plurality of teeth, such as 4–8 teeth, that are spaced around the body portion and extend outwardly therefrom to form the cutting surfaces of the reamer. Each tooth includes a rake face and a cutting edge that actually engages the workpiece in the course of reaming a hole. In some cases, the teeth are uniformly spaced around the body portion. In other cases, the teeth have non-uniform or irregular spacing. However, reamers of each type suffer from a number of problems in precision applications, such as reaming holes with small tolerances. These problems become particularly troublesome in applications that require a number of precisely toleranced holes to be formed, such as during the construction of airframe components.

One problem with standard reamers having evenly spaced teeth is that such reamers typically produce finished holes that have a lobed pattern. Lobing is caused in part by vibration and unequal rubbing forces on the reamer during operation, and often create form error that exceeds the allowable size tolerance specified in a given application, such as the tolerances specified in ASME Y14.5. Specifically, the form error occurs when the reamer axis orbits about the axis of the hole in a whirling motion at integer multiples of the number of teeth (N) per revolution, resulting in a hole form with N+1 or N−1 lobes depending on whether the reamer axis orbits in the hole in a backward or forward direction, respectively. Typically, the reamer is rotated about its longitudinal axis in a forward, or clockwise, direction, while the reamer orbits about the hole axis in a backward, or counterclockwise, direction. In addition, the lobes continue to regenerate as the reamer progresses through the hole. See FIG. 7a.

Irregular pitch reamers address the lobing problems caused by reamers with uniform teeth spacing. Specifically, irregular pitch reamers use non-uniform teeth spacing to reduce the whirling of the reamer, thereby improving roundness control. As a result of the irregular teeth spacing, the reamer axis oscillates about the hole axis once per tool revolution compared to the multiple oscillations of a standard reamer having evenly spaced teeth as described above. However, while the roundness of the hole is improved, the irregular spacing causes an imbalance in the forces exerted on the reamer. This force imbalance causes the reamer axis to be offset from the hole axis, thereby producing oversized holes that can also exceed the specified tolerance of a given application. In particular, each tooth has a force vector with magnitude and direction components as shown in FIG. 4. When summed, the force vectors of an irregular pitch reamer are imbalanced, thereby creating a net tool offset force that causes the reamer to be offset from the hole axis. This offset, in turn, causes the resulting hole to be oversized.

Thus, conventional reamers do not produce holes that consistently have the roundness and the precise size that are desired. Instead, standard reamers with regularly spaced teeth generally create lobes in the finished surface of the hole, while irregular pitch reamers typically create round finished holes with an oversize condition. It would therefore be desirable to provide a reamer that creates a smooth finished surface for a drilled hole that is sufficiently round and is sized within tolerance.

SUMMARY OF THE INVENTION

These and other needs are provided, according to the present invention, by a force balanced irregular pitch reamer that substantially reduces or eliminates the formation of lobes in the finished surface of a formed hole without causing an oversize condition. As such, the reamer is particularly well suited for precision cutting operations requiring small tolerances in both size and form.

According to the present invention, a reamer, such as a force balanced irregular pitch reamer, is provided that comprises a shank, a body portion connected to one end of the shank, and a plurality of teeth projecting outwardly from a longitudinally extending portion of the body. The teeth of the reamer are preferably non-uniformly spaced in order to reduce lobing. Each tooth has a rake face and a cutting edge and defines a rake angle between the rake face and an imaginary line extending between the longitudinal axis of the reamer and the cutting edge. According to the present invention, the rake angle for a particular tooth varies from that of another tooth, such as by at least 2°, such that the cutting force vector established by each tooth are substantially balanced, thereby permitting the longitudinal axis of the reamer and the hole axis to be substantially colinear so that a hole of the desired size can be reamed. For example, the teeth of one embodiment define rake angles of 0°, 6°, and 7°. Typically, however, the teeth do not define rake angles that exceed about 10°.

In operation, the force balanced reamer is rotated at a low to moderate rate about its longitudinal axis and is inserted into a formed hole sized slightly smaller than the reamer. The formed hole may have been formed by many methods, such as by drilling. The reamer is then advanced through the formed hole to provide a hole having the desired size and a smooth finished surface. The reamer engages the workpiece and each tooth is subjected to cutting forces. Specifically, each tooth encounters a cutting force having a magnitude and direction, thus defining a cutting force vector. The cutting force vector for each tooth is at least partially determined by the rake angle of the tooth. By summing the cutting forces that act on the teeth, the resulting effect upon the reamer can be determined.

Advantageously, the rake angles of the teeth are defined such that the sum of the cutting force vectors are approximately balanced in at least two dimensions. Thus, each tooth is subjected to a cutting force, but the rake angle of each tooth is formed in cooperative arrangement with the rake angles of the other teeth such that the sum of the cutting force vectors for all the teeth tend to negate or cancel one another, thereby balancing the reamer. As such, the reamer of the present invention creates properly sized holes since the substantial balance of the cutting force vectors substantially reduces any offset between the longitudinal axis of the reamer and the hole axis. Since the reamer of the also generally present invention includes irregularly spaced teeth, the holes created by the reamer are also generally free of lobes.

BRIEF DESCRIPTION OF THE DRAWINGS

FIG. 1 is a side view of a reamer according to one embodiment of the present invention;

FIG. 2 is an end view of a conventional, evenly-spaced reamer illustrating a rake angle and a relief angle;

FIG. 3 is a cross-sectional view of a hole formed according to the present invention;

DETAILED DESCRIPTION OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
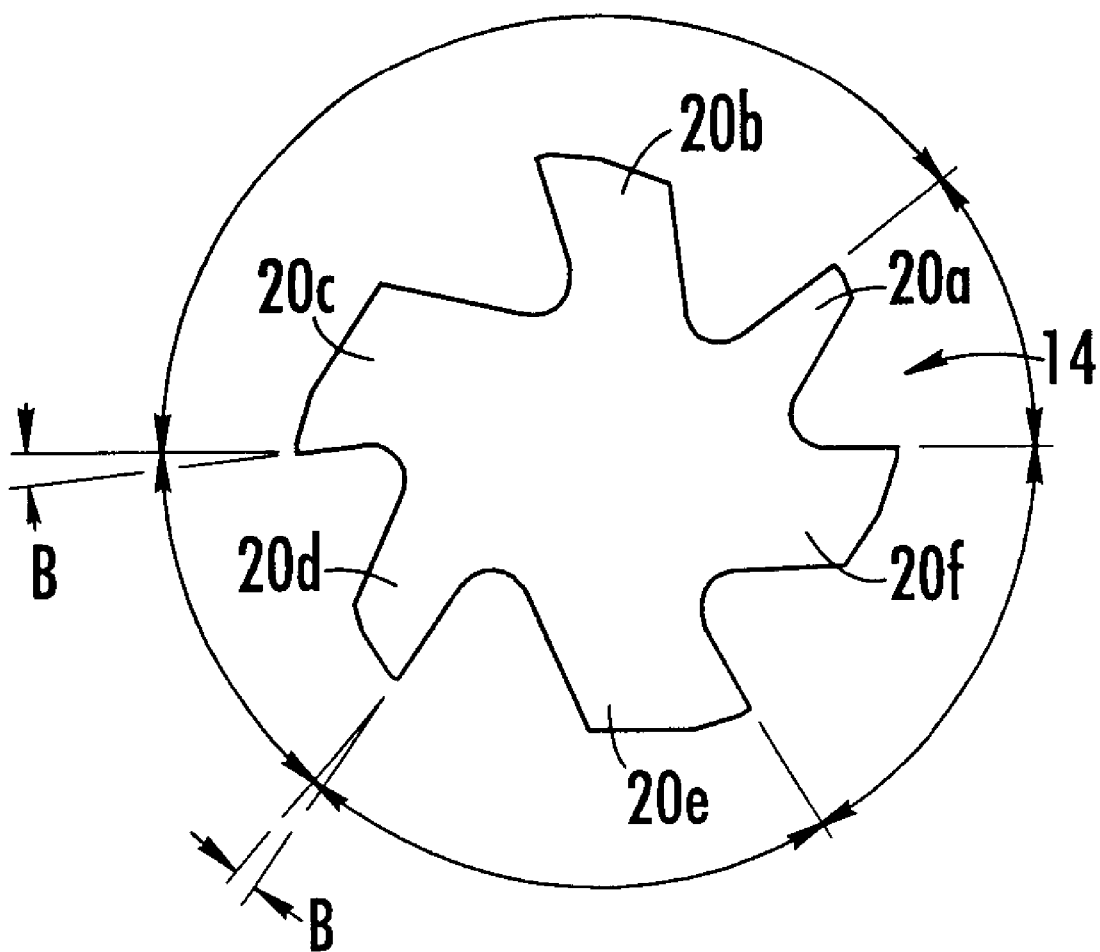
FIG. 6 is an end view of a reamer according to one embodiment of the present invention.

Turning first to FIGS. 1 and 6, there are shown side and end views of the force balanced reamer 10 in accordance with one embodiment of the present invention. As described in detail below, the force balanced reamer 10 can be used in precision applications, such as the reaming of the plurality of precisely toleranced holes required for airframe manufacture and assembly. However, the reamer 10 may also be used in other applications without departing from the spirit and scope of the invention.

FIG. 1 illustrates the reamer 10 of the present invention. The reamer includes a generally cylindrical shank 12 defining a longitudinal axis 18 and adapted to be operatively engaged by a power driver, a drill motor or the like (not shown). The reamer also includes a body portion 14 at one end of the shank 12 that also serves to define the longitudinal axis 18. Typically, the shank and body portion are integrally formed of a metal, such as steel or carbide, such that the mechanical properties of the reamer 10 can be tailored for a specific application. However, the shank and the body portion can be separate components that are interconnected, if so desired.

The reamer also includes a plurality of teeth 20 that extend away from, i.e., radially out from, the body portion 14 and are adapted for engaging the workpiece 41 and finishing an existing hole 40. The teeth 20 have respective cutting edges 24 that cooperate to define an outer cutting diameter 42, which is slightly larger than the hole 40, and are typically formed from the same material as the shank 12 and body portion 14, although other materials may be used. In this regard, the teeth are generally integral with the body portion 14, although the teeth or portions of the teeth, such as the cutting edges, can be discrete components that are interconnected to the body portion.

The teeth 20 extend longitudinally along the body portion 14, and typically include tapered sections at both ends thereof Typically, the teeth 20 are chamfered at the distal or leading end of the body portion 14 to define a chamfer angle A, which facilitates cooperation between the reamer 10 and the hole 40 and reduces initial cutting forces on the teeth 20. The chamfer angle is typically about 45°, so that the reamer can be gradually introduced to the hole 40. The teeth 20 may also be chamfered at the end of the body portion 14 proximate the shank 12, i.e., opposite the distal or leading end, if so desired.

Referring to FIGS. 2, 3 and 6, the teeth 20 are preferably regularly spaced about the body portion 14 in a non-uniform or irregular fashion. By including irregularly spaced teeth, it has been found that a lobing pattern 44 otherwise created by a reamer having regularly spaced teeth is significantly reduced, if not eliminated. In one embodiment shown in FIG. 2, the reamer 10 includes six teeth 20, although the reamer can include any number of teeth. In this embodiment, the teeth are spaced apart at 57°, 73°, 50°, 77°, 64°, and 39° intervals, respectively. As will be apparent the teeth can be spaced at different angular intervals, if so desired.

Each of the teeth 20 includes a rake face 22 and a cutting edge 24 at the distal end of the rake face. Each tooth typically has a cylindrical margin at the cutting edge 24 and then tapers away from the cutting edge to define a clearance face 26 and a relief angle C, which is specifically defined as the angle formed between the clearance face 26 and an imaginary line extending through the cutting edge in a direction perpendicular to an imaginary line extending from the longitudinal axis 18 to the cutting edge 24. The relief angle C is typically about 14°–16°. Each of the teeth 20 also defines a rake angle B, which is specifically defined as the angle formed between the rake face 22 and the imaginary line extending from the longitudinal axis 18 to the cutting edge 24. The rake angle B is typically 0°–10°, depending on the size of the rake face 22, the relief angle C, and other characteristics of the reamer 10.

Figure 4:
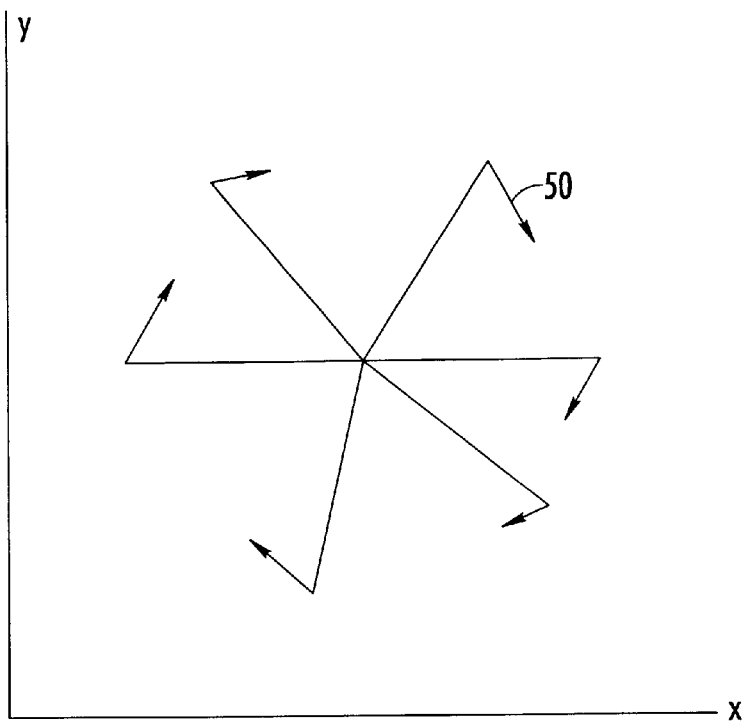
FIG. 4 is a graph depicting a force vector diagram for a conventional reamer.
Figure 5:
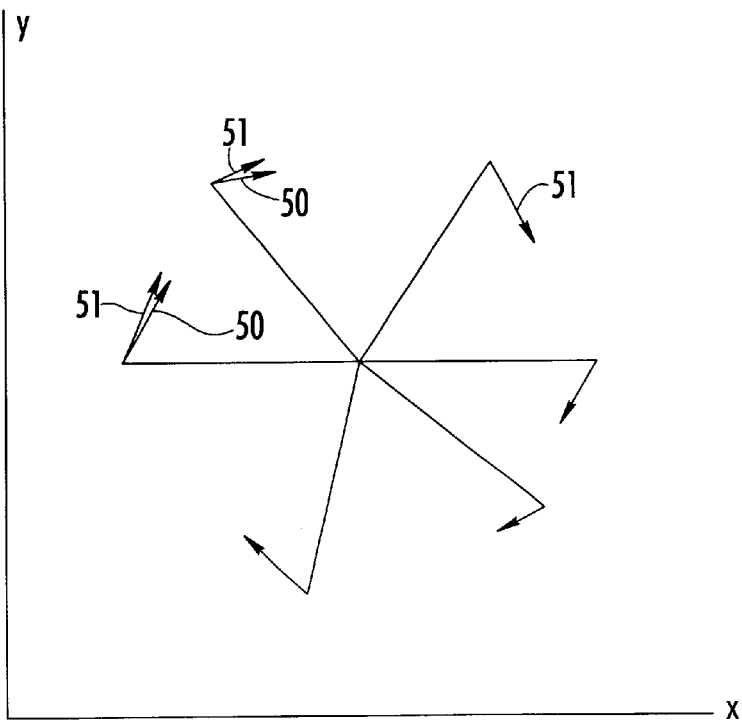
FIG. 5 is a graph depicting a force vector diagram of a reamer according to one embodiment of the present invention.

In operation, the reamer 10 is operatively positioned proximate the hole 40 in a workpiece 41. Typically, the workpiece is formed of a metal, such as aluminum, steel, or titanium, although the reamer can cut a variety of different types of workpieces, including wood and composite materials, if so desired. Once properly positioned, the reamer is rotated. The reamer of one illustrated embodiment is designed to be rotated in a counter-clockwise fashion about its longitudinal axis when viewed from the shank 12 toward the distal or leading end of the body portion 14. Typically, the reamer is rotated at a relatively low rate, such as 500–1000 rpm. The reamer is then moved into the hole 40 such that the cutting edges 24 engage the workpiece and slightly enlarge the hole to the desired diameter. While being advanced through the hole 40, each of the teeth 20 is subjected to cutting forces, which are dependent on a number of factors including the rake angle B, the amount of the workpiece 41 being removed, the cutting pressure applied to the reamer due to the specific cutting stiffness of the material, and the thickness of the chip that results from feeding of the tool and subsequent tooth passings. As shown in FIGS. 4 and 5, the forces encountered by each of the teeth 20 can be represented vectorally in two dimensions, designated as the X and Y axes, and summed to determine a net tool offset force. For comparison purposes, FIG. 4 shows the cutting force vectors 50 for a conventional irregular pitch reamer having equal rake angles of 0°, whereby the summation of the cutting force vectors results in a net tool offset force having an X-axis component of about 7 N and a Y-axis component of about 7 N. Accordingly, the net tool offset force causes the conventional reamer to be offset from the hole axis 48, thereby producing an oversized finished hole 46, as shown in FIG. 3. Specifically, the conventional reamer causes the oversize condition because the offset of the reamer from the hole axis generally orbits about the hole axis during reaming operations.

Advantageously, the reamer 10 of the present invention is designed such that the cutting force vectors 51 for each of the teeth 20 are substantially balanced, i.e., the net tool offset force is quite small and, more preferably, is approximately zero (see FIG. 5). In this context, cutting force vectors that are substantially balanced create a net tool offset force that is less than 1 N in each direction and, more preferably, is less than a fraction of a Newton in each direction. For illustration purposes only, the cutting force vectors 50 from FIG. 4 are also shown in FIG. 5. By substantially balancing the cutting force vectors and correspondingly significantly reducing the net tool offset force, any offset of the reamer from the hole axis is very small such that the resulting hole can be reamed to within much more precise tolerances, such as 0.0005 inch.

Specifically, each of the teeth 20 defines its corresponding rake angle B which at least partially establishes the corresponding cutting force vector 51. According to the present invention, at least two of the teeth 20 define rake angles B that differ. In addition, the teeth 20 are preferably spaced apart by a sizeable amount, such as 70°. While each of the teeth 20 can have different rake angles, the teeth generally define two or three different rake angles. For example, in one embodiment shown in FIG. 6, the teeth 20a–20f have rake angles of about 0°, 0°, 6°, 7°, 0°, and 0°, respectively. These angles can be determined analytically, as explained more fully below. As shown in FIG. 5, the summation of the cutting force vectors 51 established by the teeth depicted in FIG. 6 results in a net tool offset force having an X-axis component of about 0.2 N and a Y-axis component of about 0.3 N. Since the net tool offset force is quite small in each direction, i.e., less than 1 N, the reamer will not be offset much, if any, from the reamer axis. Accordingly, the reamer can form a finished hole having a diameter substantially equal to the outer cutting diameter 42 of the reamer 10, thereby permitting the hole to be formed to the desired size. In one advantageous embodiment in which the teeth are irregularly spaced, the hole formed by the reamer is also generally free from the lobing pattern 44 created by conventional reamers.

To balance the cutting forces on the reamer 10, the rake angle B for each of the teeth 20 can be determined by a mathematical computation and verified by a computer simulation. Specifically, the reamer 10 is balanced by first determining the specific cutting forces on each of the teeth 20. As will be known to those skilled in the art, the cutting force is generally determined as the product of the chip thickness, the chip width and a specific cutting pressure for a given material as well as rubbing forces on the margin and clearance faces of the teeth 20. The rake angles B for all the teeth 20 are then varied and optimized in order to minimize the resulting net tool offset force. While variations in the rake angle effect both the magnitude and the angle of the resulting cutting force, the effect on the magnitude is relatively small in comparison to the effect upon the angle. The resulting configuration of rake angles for the teeth 20 can be verified by a computer simulation, such as a time domain simulation, which accounts for the cutting forces at the tool tip, the rubbing forces on the cutting edges 24 and the rubbing and cutting forces along the sides of the teeth 20.

Figure 7A:
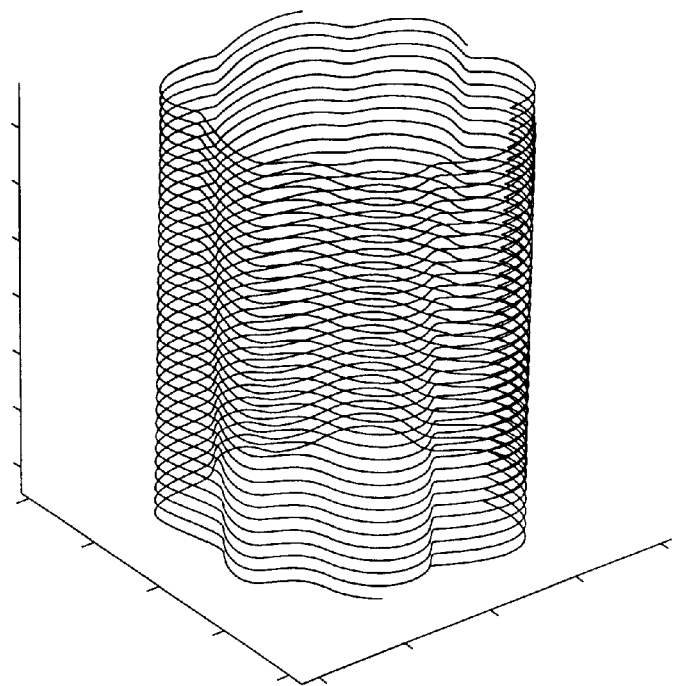
FIG. 7a is a time domain simulation graph of a hole formed by a conventional reamer.
Figure 7B:
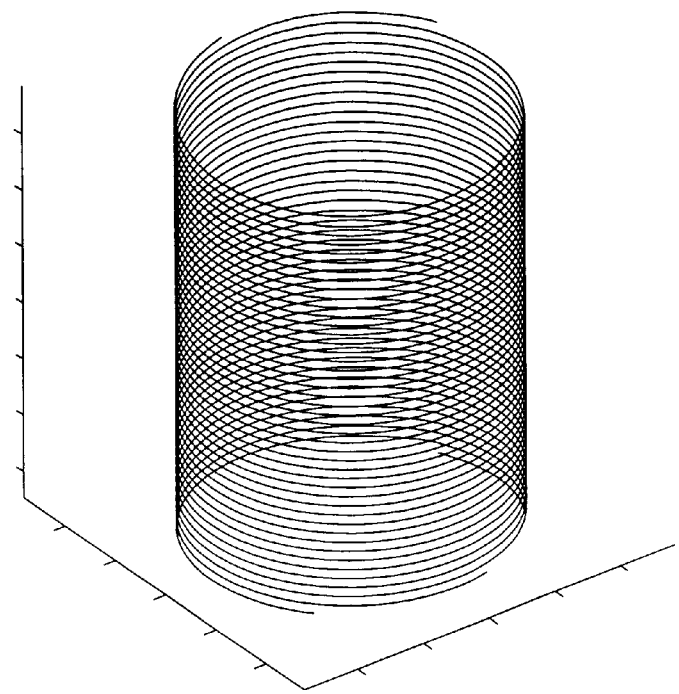
FIG. 7b is a time domain simulation graph of a hole formed by a reamer according to one embodiment of the present invention.

The time domain simulation may also generate a three-dimensional graphic detailing the finished hole profile generated by a reamer, including the runout at different elevations within the hole. For example, FIG. 7a shows a graphic detailing the finished hole profile generated by a conventional reamer. By comparison, FIG. 7b shows a graphic detailing the finished hole profile generated by a reamer 10 according to one embodiment of the present invention. While the finished hole profile of FIG. 7b still exhibits some irregularity, the chart below compares the roundness error and oversize error associated with conventional reamers having even pitch and irregular pitch, and the force-balanced irregular pitch reamer of the present invention. Graphical representation of the roundness error and oversize error for the three types of reamers mentioned above are illustrated in FIGS. 3, 7a, and 7b.

|  | Even pitch | Irregular pitch | Force-balanced, irregular pitch |
|---|---|---|---|
| Roundness error (μm) | 5.5 | 0.6 | 0.1 |
| Oversize (μm) | 0.8 | 2.7 | 0.2 |

Accordingly, the reamer 10 provides a finished hole having a diameter which is substantially equal to the outer cutting diameter 42 of the reamer, and is substantially without the lobing or oversize condition associated with conventional reamers. Accordingly, the reamer of the present invention can finish holes to within precise tolerances of a desired shape and size.

From the foregoing it will be seen that there has been shown and described a unique force balanced reamer that avoids the undesirable problems exhibited by conventional reamers, namely the formation of lobes around the perimeter of the finished hole and the formation of a finished hole having an oversize condition. Thus, the present invention provides a reamer particularly useful in precision applications, such as during aircraft manufacture and assembly, whereby many holes having close tolerances must be formed.

While particular embodiments have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of the present invention within the true spirit and the scope thereof.

That which is claimed:

1. A reamer, comprising:
   a shank;
   a body defining a longitudinal axis, said body connected to one end of said shank and capable of being rotated about said longitudinal axis;
   a plurality of teeth projecting outwardly from a longitudinally-extending portion of said body, said teeth having a cutting edge and a rake face and defining a rake angle between said rake face and an imaginary line extending between said longitudinal axis and the cutting edge, said rake angle of each of said teeth establishing a resultant cutting force vector, wherein at least some teeth have rake angles that differ by at least 2° and at least one of said rake angles is about 6°.

2. A reamer, comprising:

a shank;

a body defining a longitudinal axis, said body connected to one end of said shank and capable of being rotated about said longitudinal axis;

a plurality of teeth projecting outwardly from a longitudinally-extending portion of said body, said teeth having a cutting edge and a rake face and defining a rake angle between said rake face and an imaginary line extending between said longitudinal axis and the cutting edge, said rake angle of each of said teeth establishing a resultant cutting force vector, wherein at least some teeth have rake angles that differ by at least 2° and at least one of said rake angles is about 7°.

3. A reamer, comprising:

a shank;

a body defining a longitudinal axis, said body connected to one end of said shank and capable of being rotated about said longitudinal axis; and a plurality of teeth projecting outwardly from a longitudinally-extending portion of said body, said teeth having a cutting edge and a rake face and defining a rake angle between said rake face and an imaginary line extending between said longitudinal axis and the cutting edge, said rake angle at least partially establishing an associated cutting force vector for the respective tooth wherein said plurality of teeth includes at least one tooth having a rake angle of about 0°, at least one tooth having a rake angle of about 6°, and at least one tooth having a rake angle of about 7°.

4. A force balanced reamer, comprising;

a shank;

a body defining a longitudinal axis, said body connected to one end of said shank and capable of being rotated about said longitudinal axis; and a plurality of irregularly-spaced teeth projecting outwardly from a longitudinally-extending portion of said body, each of said irregularly-spaced teeth having a cutting edge and a rake face and defining a rake angle between said rake face and an imaginary line extending between said longitudinal axis and the cutting edge, said rake angle of each of said irregularly-spaced teeth establishing an associated cutting force vector, wherein at least some of said irregularly-spaced teeth have different rake angles that are selected so that said cutting force vectors are substantially balanced, wherein at least some teeth have rake angles that differ by at least 2°, and at least one of said rake angles is at least about 6°.

5. A force balanced reamer, comprising:

a shank;

a body defining a longitudinal axis, said body connected to one end of said shank and capable of being rotated about said longitudinal axis; and a plurality of irregularly-spaced teeth projecting outwardly from a longitudinally-extending portion of said body, each of said irregularly-spaced teeth having a cutting edge and a rake face and defining a rake angle between said rake face and an imaginary line extending between said longitudinal axis and the cutting edge, said rake angle of each of said irregularly-spaced teeth establishing an associated cutting force vector, wherein at least some of said irregularly-spaced teeth have different rake angles that are selected so that said cutting force vectors are substantially balanced, and at least one of said rake angles is about 9°.

6. A reamer according to claim 3 wherein said teeth are positioned at irregular intervals around said body.

7. A reamer according to claim 3 wherein the rake angles defined by said teeth are selected so that the cutting force vectors are substantially balanced.

8. A reamer according to claim 3 wherein at least two teeth have rake angles of about 6° and at least three teeth have rake angles of about 0°.

* * * * *

UNITED STATES PATENT AND TRADEMARK OFFICE
CERTIFICATE OF CORRECTION

PATENT NO. : 6,379,090 B1
DATED : April 30, 2002
INVENTOR(S) : Halley et al.

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C. 154(b) by 17 days" should read -- Subject to any disclaimer, the term of this patent is extended or adjusted under 35 U.S.C. 154(b) by 0 days. --.

<u>Column 7,</u>
Line 36, after "comprising" the semicolon ";" should be a colon -- : --.

Signed and Sealed this

First Day of October, 2002

*Attest:*

*Attesting Officer*

JAMES E. ROGAN
*Director of the United States Patent and Trademark Office*